United States Patent [19]

Granger

[11] Patent Number: 4,725,893
[45] Date of Patent: Feb. 16, 1988

[54] SCANNERS

[75] Inventor: Edward M. Granger, Rochester, N.Y.

[73] Assignee: Eastman Kodak Company, Rochester, N.Y.

[21] Appl. No.: 66,368

[22] Filed: Jun. 25, 1987

[51] Int. Cl.⁴ .............................................. H04N 1/028
[52] U.S. Cl. .................................... 358/294; 250/228; 358/75; 358/293
[58] Field of Search .................... 358/293, 294, 75, 80, 358/285; 250/228

[56] References Cited

U.S. PATENT DOCUMENTS

| | | | |
|---|---|---|---|
| 3,874,799 | 4/1975 | Isaacs et al. | 356/173 |
| 3,893,166 | 7/1975 | Pugsley | 358/80 |
| 4,076,421 | 2/1978 | Kishner | 356/96 |
| 4,150,898 | 4/1979 | Suga | 561/405 |
| 4,348,100 | 9/1982 | Snelling | 355/14 |
| 4,453,180 | 6/1984 | Juergensen | 358/75 |
| 4,473,848 | 9/1984 | Juergensen | 358/294 |
| 4,568,984 | 2/1986 | Juergensen et al. | 358/293 |
| 4,595,947 | 6/1986 | Brueggemann | 358/75 |
| 4,658,131 | 4/1987 | Stark | 250/228 |
| 4,673,818 | 6/1987 | Guerra | 250/228 |

Primary Examiner—Howard W. Britton
Attorney, Agent, or Firm—John B. Turner

[57] ABSTRACT

The scanner includes a platen having a convex circular cylindrical surface. The platen has a slot open at the cylindrical surface and which is elongate in a plane perpendicular to the axis of the cylindrical surface. A spot of light is scanned over the portion of the document overlying the slot. Scanning is achieved by a mirror oscillating about an axis coincident with the platen surface axis. Light from the spot reflected by the document is integrated in an integrating enclosure and is incident on detector means. There are means for moving the document over the cylindrical surface in a direction parallel to the surface axis.

4 Claims, 3 Drawing Figures ically opaque and transparency signals of each point of the raster. Line scanning is effected with a light source directed at a polygon with the beam deflected by the polygon being passed through a lens and directed at the document. Light reflected by the document is integrated in an integrated cylinder and collected to a sensor. When scanning a raster, for the signals derived from the sensor to have useful meaning, it must be known accurately what is the actual location of the scan line to which the instantaneous signal relates. In U.S. Pat. No. 4,568,984, because the document is flat and the scanning beam is scanned at constant angular velocity, a $f\theta$ lens is needed if the linear velocity of the point of incidence of the beam on the document is to be linearly related to the angular velocity of the polygon. If the beam is convergent on the document, then the lens also has to exhibit a focal length which varies with the inclination of the incident beam, if the beam is always to be held in focus on the flat document and thereby give a spot with a diameter which is uniform whatever the position along the scan line.

SCANNERS

BACKGROUND OF THE INVENTION

1. Field of the Invention

This invention relates to scanners for providing electronic signals descriptive of information in a document.

2. Description Relative to the Prior Art

U.S. Pat. No. 4,568,984 discloses method and apparatus for scanning rasters to generate simultaneously opaque and transparency signals of each point of the raster. Line scanning is effected with a light source directed at a polygon with the beam deflected by the polygon being passed through a lens and directed at the document. Light reflected by the document is integrated in an integrated cylinder and collected to a sensor. When scanning a raster, for the signals derived from the sensor to have useful meaning, it must be known accurately what is the actual location of the scan line to which the instantaneous signal relates. In U.S. Pat. No. 4,568,984, because the document is flat and the scanning beam is scanned at constant angular velocity, a $f\theta$ lens is needed if the linear velocity of the point of incidence of the beam on the document is to be linearly related to the angular velocity of the polygon. If the beam is convergent on the document, then the lens also has to exhibit a focal length which varies with the inclination of the incident beam, if the beam is always to be held in focus on the flat document and thereby give a spot with a diameter which is uniform whatever the position along the scan line.

A lens which has the above-described capabilities is complex and expensive.

SUMMARY OF THE INVENTION

It is an object of the present invention to avoid the need for an expensive lens in a scanner.

In accordance with the present invention the object is achieved by providing a platen having a convex, circular cylindrical surface. There are means for moving a document over the platen in contact with the cylindrical surface in a direction parallel to the axis of the cylindrical surface. The platen has a slot open at the cylindrical surface and elongate in a plane perpendicular to the axis. An opaque enclosure bounds an enclosed integrating space and has a diffusely reflecting internal surface. The enclosure is at the side of the platen remote from the cylindrical surface. The slot is open to the enclosed space. The axis is at the exterior of the enclosure remote from the platen. A window provides acess for light between the exterior and the interior of the enclosure. The window is located across the plane perpendicular to the axis and is so disposed and of such size that all parts of the slot may be seen from the axis through the window. Means are provided for directing a beam of light from the exterior of the enclosure through the window and the slot to form a spot on that portion of a document in contact with the platen which overlies said slot. The line of the axis of the portion of the beam within the enclosure intersects the axis of the cylindrical surface. There are means for imparting a scanning motion to the beam so that the spot scans the document and whereby the line of the axis of the beam remains intersecting the axis of the cylindrical surface during the scanning motion. Detector means are provided for sensing the intensity of light diffusely reflected into the enclosed space by the portion of said document illuminated by the spot and for providing an electronic signal related to the intensity of the reflected light and thereby descriptive of the information in the portion of the document on which the spot is incident.

Embodiments of the invention may be intended for poviding simultaneously a plurality of signals indicative of the intensities of a plurality of different portions of the spectrum to provide color information. In such embodiments, the means for directing a beam of light directs a beam of white light. The diffusely reflecting internal surface of the opaque enclosure is white. The detector means includes a plurality of sensors, each having a respective filter. The filters are adapted to pass different portions of the spectrum whereby each of the sensor provides an electronic signal indicative of the intensity of the portion of the spectrum passed by the filter associated with the respective sensor.

The means for imparting a scanning motion to the beam may include a mirror in the path of the beam and means for oscillating the mirror in a rotary motion about the axis of the cylindrical surface.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

The embodiment of the invention illustrated in the accompanying drawings is intended for use in the graphic arts industry and provides three color signals.

The scanner 11 includes a platen 13. The platen 13 has a convex circular cylindrical surface 15. The circular cylindrical form of the surface 15 has an axis 17. In the present embodiment, the arcuate extent of the surface 15 is such that it subtends an angle of about 60° at the axis 17.

Figure 1:
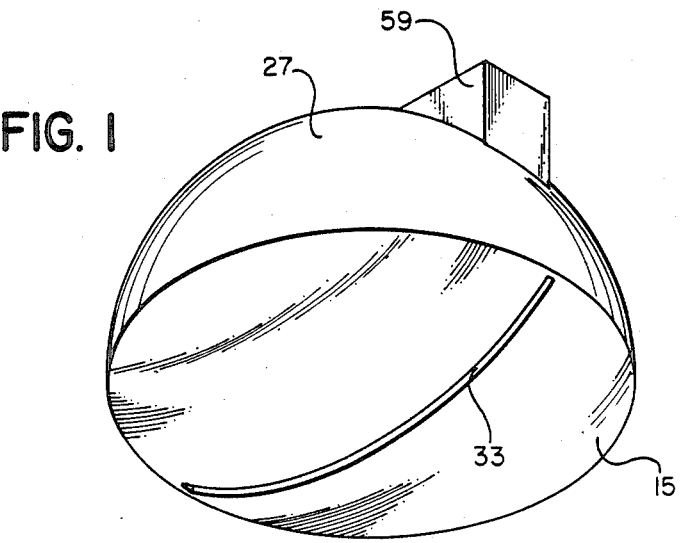
FIG. 1 is a perspective view of a scanner embodying the present invention, with parts omitted for the sake of illustration and understading.

There are means 19 for moving a document over the platen 13 in contact with the cylindrical surface 15. The document moving means 19 include a shroud 21 and driving rollers 23. The shroud 21 conforms to the surface 15 and is spaced therefrom by a distance just sufficient to allow a document to pass between the shroud 21 and the platen surface 15. The driving rollers 23 are driven in rotation by a common drive 25 to have uniform peripheral speed. The rollers nip a document against the platen surface 15 and, when rotated, move a document in a direction parallel to the axis 17. The document moving means 19 are omitted in the perspective view illustrated in FIG. 1, so that the platen surface 15 may be seen.

At the side of the platen 13 remote from the surface 15 there is an opaque enclosure 27. In the present embodiment the enclosure 27 is spherical. The enclosure 27 bounds an enclosed integrating space 29. The interior surface 31 of the sperical enclosure 27 is white and is a diffuse reflector; for example, it may be painted with titanium white paint.

The platen 13 has a slot 33 disposed in a plane to which the axis 17 is perpendicular and in which the center of the spherical form of the enclosure 27 is located. The slot 33 is narrow in the direction parallel to the axis 17 and is elongate in the plane to which the axis 17 is perpendicular.

A window 35 in the spherical enclosure 27 provides access for light between the exterior and the interior of the enclosure 27. The window 35 is located across the plane containing the slot 33 to which the axis 17 is perpendicular. The window 35 is located on a diameter of the sperical form of the enclosure 27 which diameter both intersects the axis 17 and passes through the slot 33. The disposition and size of the window 35 is such that all parts of the slot 33 may be seen from the axis 17 through the window 35.

Outside the window 35 there is a mirror 37 which is mounted for rotational oscillation about the axis 17. The mirror 37 is driven in oscillation at high frequency by a galvo-drive 39. As may be observed, the axis 17 is outside the enclosure so that the mirror may also be outside the enclosure.

There is a source of white light which, in the present embodiment, is a halogen incandescent bulb 41. The bulb 41 is disposed in a light-tight chamber 47 one wall 43 of which has a pinhole 45.

Figure 2:
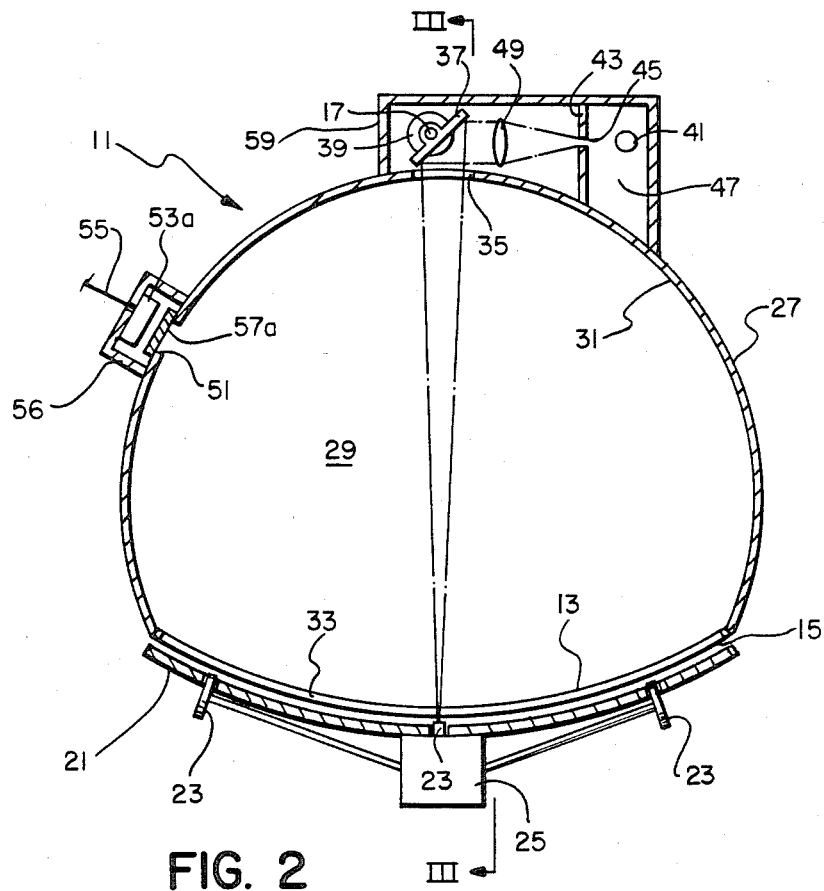
FIG. 2 is a sectional view of the scanner taken on the line II—II in FIG. 3.
Figure 3:
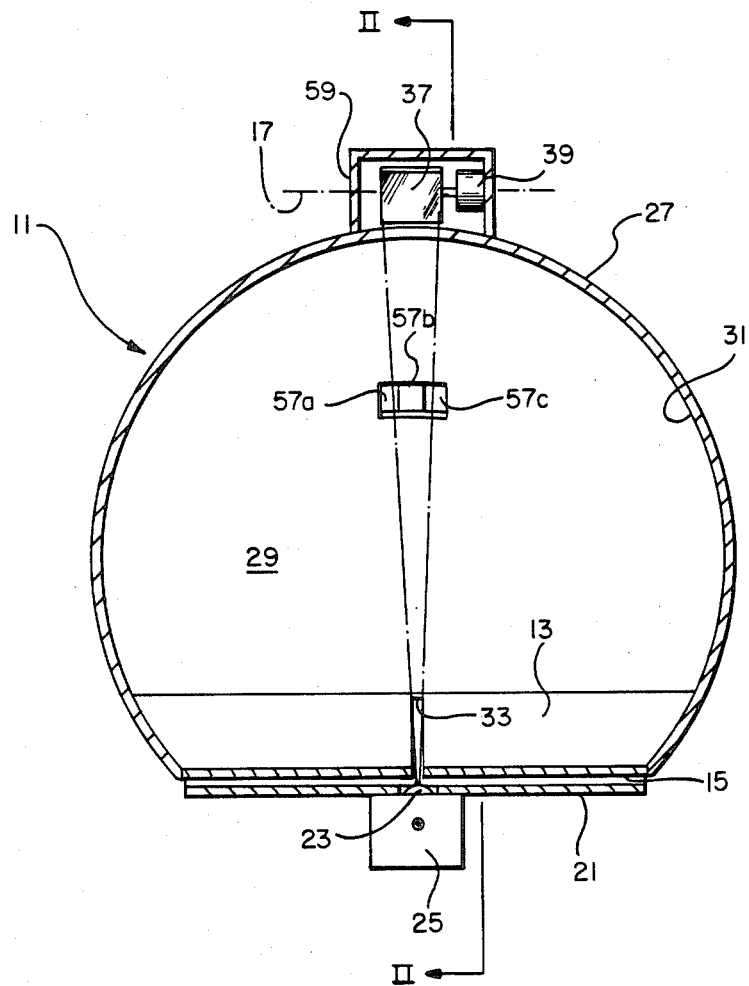
FIG. 3 is a sectional view at right angles to the view of FIG. 2, taken on line III—III in FIG. 2.

A lens 49 focuses an image of the pinhole 45 on a document against the platen surface 15. As may be seen in FIG. 2, the ray path between the lens 49 and the document on the platen surface 15 is folded by the mirror 37. The line of the axis of the portion of the beam within the enclosure 27 intersects the axis 17 of the cylindrical surface 15.

The opaque enclosure 27 has a second window 51 behind which are mounted, on the outside of the enclosure, detector means in the form of three light-sensitive devices which, in the present embodiment, are photomultiplier tubes 53. The photomultiplier tubes 53 a, b, c, transmit their signals, indicative of the intensity of light incident on them, along leads 55. The tubes 53 are disposed in a light-tight enclosure 56.

Each photomultiplier tube 53 has in front of it a filter 57 a, b, c. The filters allow different portions of the spectrum to reach the different tubes 53 a, b, c so that each tube 53 produces a signal indicative of the intensity of light in a respective portion of the spectrum.

The lens 49 and its galvo drive 39 are disposed in a light-tight enclosure 59 which is formed, in part, by the wall 43. The inside of the enclosure 59 is painted black.

In operation, the bulb is energized so that it emits white light. Light from the bulb 41, which passes through the pinhole 45 is focussed by the lens into a spot on the document on the plate surface 15.

The mirror galvo-drive 39 is energized so that it oscillates the mirror 37 through an angle half that subtended by the document at the axis 17. The oscillating mirror 37 causes the spot of light to scan the full width of the document on the platen surface 15. Because the platen surface 15 is cylindrical with the cylindrical form having an axis the same as that of the oscillating rotary motion of the mirror 37, the spot remains 'in focus' throughout its arcuate scanning motion. The line of the axis of the beam remains intersecting the axis 17 of the cylindrical surface 15 during the scanning motion.

The drive 25 is energized and rotates the rollers 23 to move the document over the platen surface 15 in a direction parallel to the axis 17. The document is moved at a speed depending on the rate of scan of the mirror and the desired density of scan lines on the document.

Light incident on the document in the spot is reflected into the integrating space 29. That light which is spectrally reflected goes out of the window 35. That light which is diffusely reflected is indicent on the white diffusely reflecting interior surface of the opqaque enclosure and is multiply diffusely reflected within the enclosure. Multiply diffusely reflected light passes through window 51 and is selectively passed through the filters 57 a, b, and c and to be incident on the photomultiplier tubes 53 a, b, c. The tubes 53 a, b, c create signals indicative of the intensity of light incident on them. The signals are, therefore, indicative of the color and brightness of the small region of the document on which the spot of light is instantaneously incident. The color and brightness may be regarded as information in the document.

The fact that spectrally reflected light is lost out of the window 35 is desirable in the graphic arts industry wherein it is usually desirable to sense only diffusely reflected light.

In the embodiment described above, it is the mirror 37 and its galvo-drive 39 which impart a scanning motion to the light beam. In other embodiments, other scanning means may be adopted, for example, a polygon may be used. As is known, a polygon includes a plurality of planar mirrors mounted for rotation about a common axis and driven in rotation by a motor. In an embodiment including a polygon, the common axis about which the mirrors are mounted is coincident with the axis of the cylindrical surface of the platen.

In the embodiment particularly described above, the opaque enclosure 27 is spherical. It is to be understood that other shapes of boundary enclosures for the integrating space may be adopted. However, a spherical enclosure provides the most efficient use of light and avoids 'hot spots' and other problems with positioning of the light sensitive devices.

While the light-sensitive devices have been described above, as being photomultplier tubes, which are known to be highly sensitive, it is to be understood that other devices, such as CCDs, may be used. Also, while the embodiment specifically described includes three photomultiplier tubes and three filters it is to be understood that other embodiments of the invention may include different numbers of light-sensitive devices and filters.

The invention has been described in detail with particular reference to a presently preferred embodiment, but it will be understood that variations and modifications can be effected within the spirit and scope of the invention.

What is claimed is:

1. A scanner for providing electronic signals descriptive of information in a document, including:
   a platen having a convex, circular cylindrical surface, said cylindrical surface having an axis;
   means for moving a document over said platen in contact with said cylindrical surface in a direction parallel to said axis;
   said platen having a slot open at said cylindrical surface and elongate in a plane perpendicular to said axis;
   an opaque enclosure bounding an enclosed integrating space and having a diffusely reflecting internal surface, said enclosure being at the side of said platen remote from said cylindrical surface, said slot being open to said enclosed space, said axis being at the exterior of said enclosure remote from said platen;

a window providing access for light between the exterior and the interior of said enclosure, said window being located across said plane perpendicular to said axis and so disposed and of such size that all parts of said slot may be seen from said axis through said window;

means for directing a beam of light from the exterior of the enclosure through said window and said slot to form a spot on that portion of a document in contact with said platen which overlies said slot, the line of the axis of the portion of said beam within said enclosure intersecting said axis of said cylindrical surface;

means for imparting a scanning motion to said beam so that said spot scans said document and whereby said line of said axis of said beam remains intersecting said axis of said cylindrical surface during said scanning motion; and detector means for sensing the intensity of light diffusely reflected into the enclosed space by the portion of said document illuminated by said spot and for providing an electronic signal related to the intensity of the reflected light and thereby descriptive of the information in the portion of the document on which the spot is incident.

2. A scanner as claimed in claim 1, wherein:

said means for directing a beam of light directs a beam of white light, said diffusely reflecting internal surface of said opaque enclosure is white; and said detector means includes a plurality of sensors each having a respective filter, said filters being adapted to pass different portions of the spectrum whereby each of said sensors provides an electronic signal indicative of the intensity of the portion of the spectrum passed by the filter associated with the respective sensor.

3. A scanner as claimed in claim 1 or 2, wherein:

said means for imparting a scanning motion to said beam includes a mirror in the path of the beam and means for oscillating the mirror in rotary motion about the axis of said cylindrical surface.

4. A scanner as claimed in claim 2, wherein:

said means for directing a beam of white light includes a halogen incandescent bulb and a lens for focussing light into a spot on the document.

* * * * *